July 26, 1932.    R. PORTE    1,868,848
APPARATUS FOR DELIVERING MEASURED QUANTITIES OF LIQUID
Filed Jan. 30, 1928    4 Sheets-Sheet 3
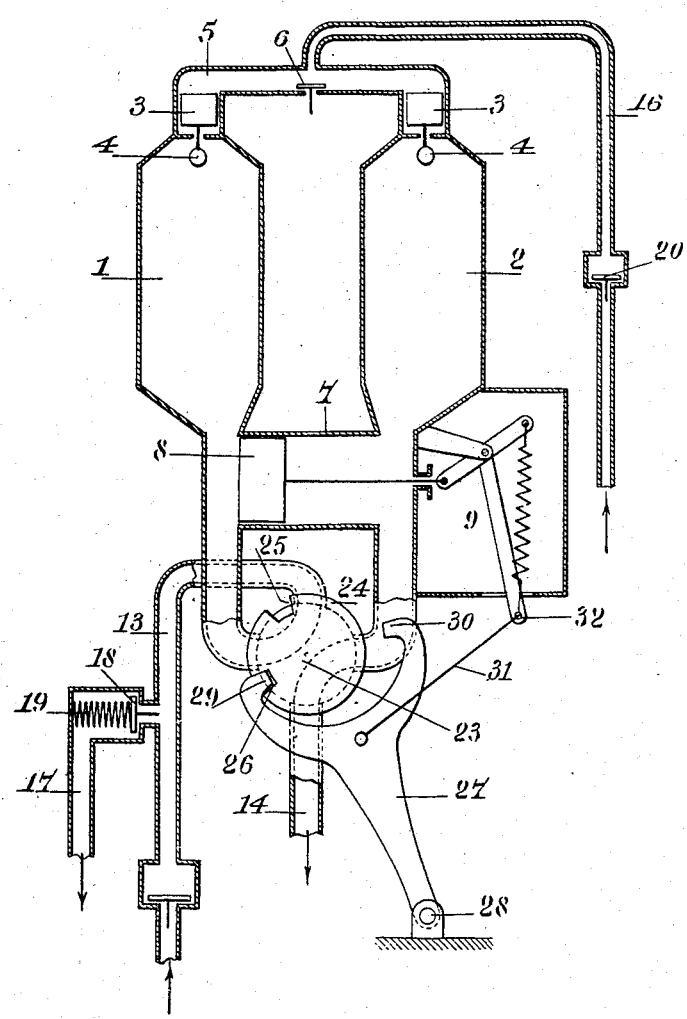

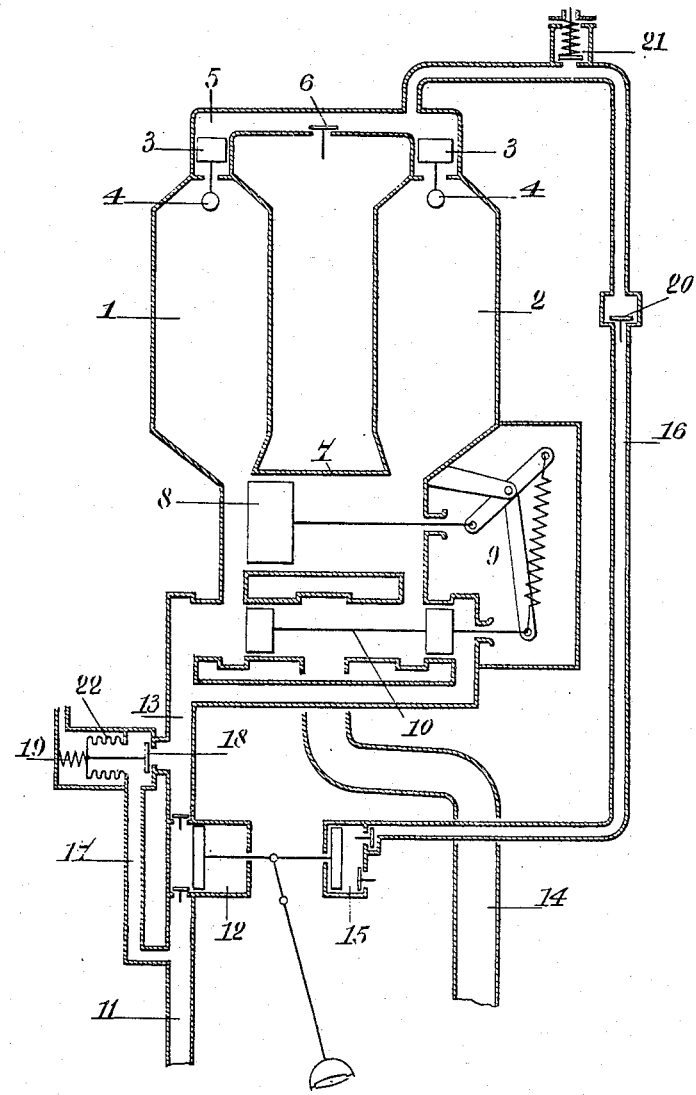

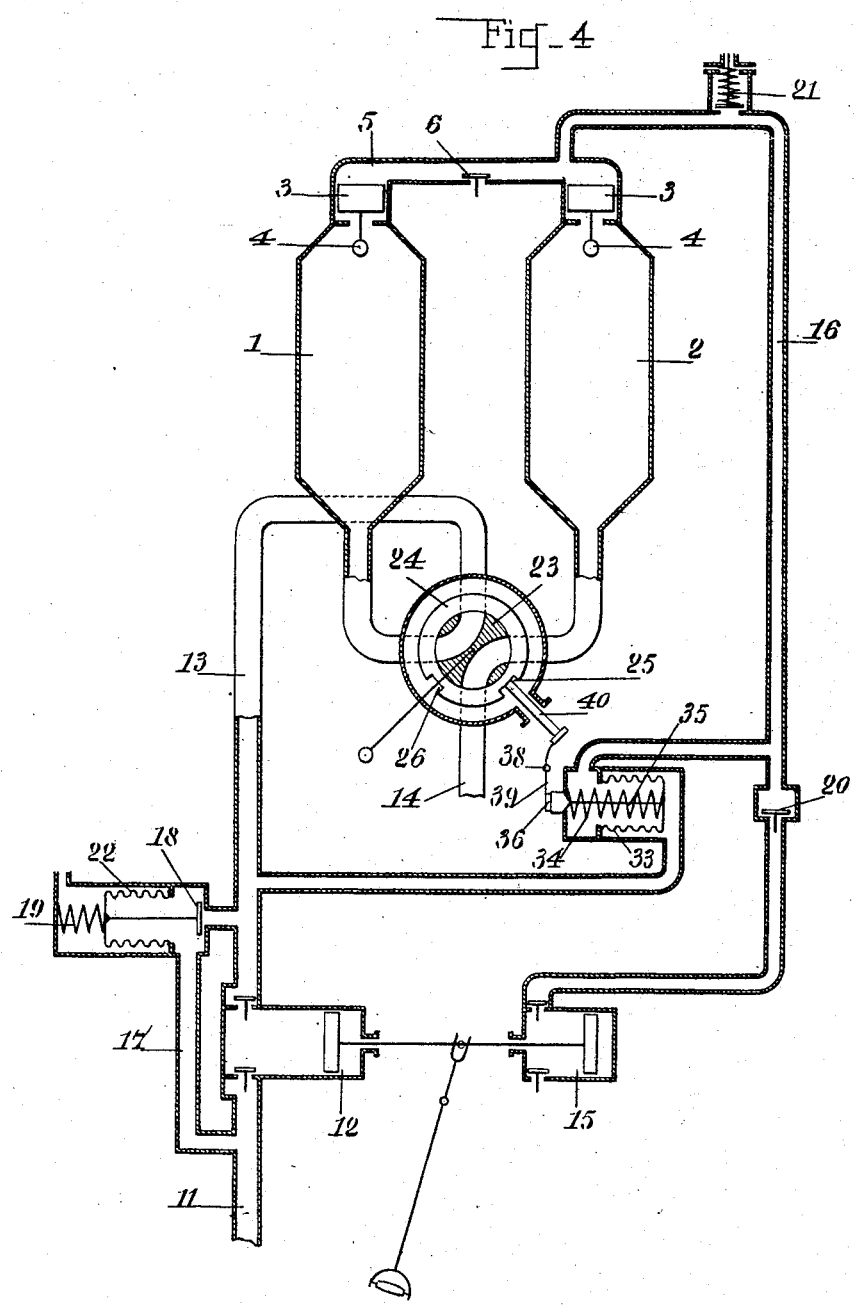

Patented July 26, 1932

1,868,848

UNITED STATES PATENT OFFICE

RENÉ PORTE, OF PARIS, FRANCE, ASSIGNOR TO SOCIETE HARDOLL, ETABLISSEMENTS HARIVEAU, DOLIMIER ET RENE PORTE & CIE. REUNIS, OF LEVALLOIS-PERRET, FRANCE

APPARATUS FOR DELIVERING MEASURED QUANTITIES OF LIQUID

Application filed January 30, 1928, Serial No. 250,642, and in Belgium February 2, 1927.

Errors have been found in the distribution of liquid by means of distributing apparatus in which the reversal is produced following the excess pressure produced by the complete filling of the gage which is being filled, be this reversal automatic or manual. These errors are due to the fact that the gage being filled is completely filled before that being emptied is completely emptied. Reversal is effected or is then possible and the quantity of liquid supplied by the apparatus is less than it should be.

The object of the present invention is to prevent this source of fraud, which may or may not be intentional, and consists, on the one hand, in limiting the pressure in the gage being filled and, on the other, increasing the pressure of that being emptied for as long as it is being emptied. For this purpose a branch passage on the filler pipe of the apparatus is open when the pressure tends to exceed certain limits, in the gage being filled, while a source of gases under pressure passes compressed gas, at least into the gage being emptied, and thus increases the pressure in this latter up to the moment in which it is entirely empty; the gas source is in communication with the atmosphere and as a result the pressure in this gage drops rapidly. Reversal may then be produced as soon as there is excess presure of the liquid following the complete filling of the gage being filled.

By way of example and simply in order to make the description more clearly understood, various embodiments of the invention are illustrated in the accompanying drawings in which:

Fig. 2 shows in vertical section a complete automatic apparatus constructed according to the invention.

Fig. 3 illustrates the application of the invention to a known automatic apparatus, shown in vertical section.

Fig. 4 is a modification of Fig. 3.

Figure 1:
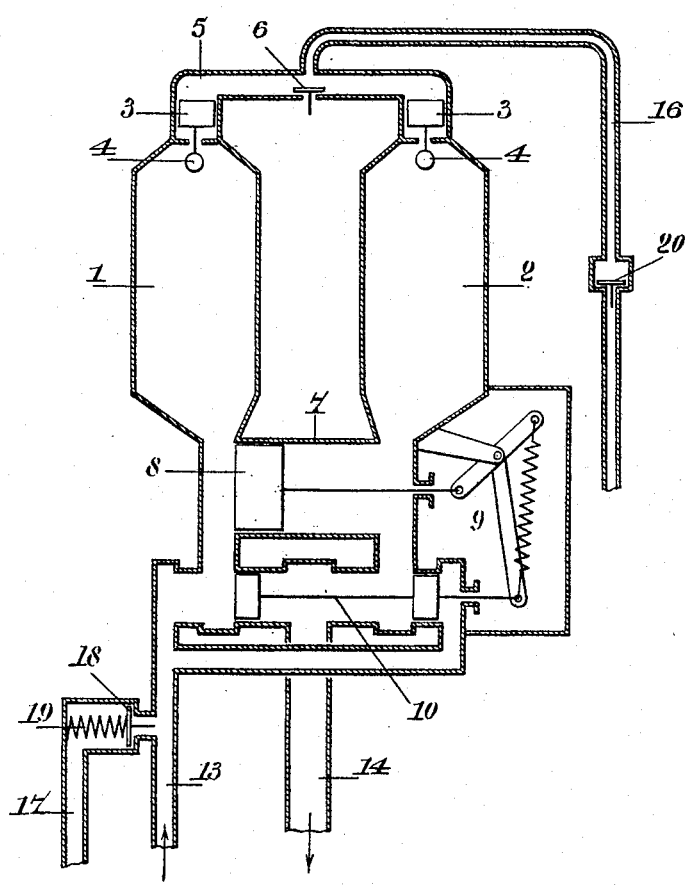
Fig. 1 illustrates the application of the invention to an automatic apparatus for delivering measured quantities of liquid.

In the examples shown in Figs. 1 and 2 it is seen that the apparatus comprises two quantity measuring and delivering vessels 1 and 2 each provided at its upper part with a float 3 to which is secured a valve 4, adapted to close the upper orifice of the corresponding vessel when the float is raised by the liquid. The two chambers, in which the floats 3 move, are connected together by an atmospheric exchange pipe 5 which is provided with an air admission valve 6. The lower part of each measuring vessel delivers into a space 7 in which moves a piston 8 acted upon on its two faces by the pressure existing in the measuring vessels.

This piston controls a distributing slide valve 10 by means of which each measuring vessel is allowed to empty and fill in turn through the medium of a mechanism 9. The liquid drawn in through the pipe 11 is delivered by a pump 12 (Fig. 2) through the delivery pipe 13 into one measuring vessel or the other according to the position of the distributing valve 10. Each measuring vessel discharges in turn through the pipe 14. The control for the pump 12 is rigid with that of an air pump 15 delivering compressed air through the pipe 16 into the atmospheric exchange duct 5.

According to the invention and as shown in Fig. 1, a pipe 17 controlled by a valve 18 subjected to the action of a spring 19, is made to open into the delivery pipe 13, this valve 18 being so arranged that for a given pressure of liquid in the delivery pipe 13 this valve 18 establishes communication between the pipes 13 and 17, the latter opening out in front of the supply pump of the apparatus. In the apparatus shown in Fig. 2 the pipe 17 opens into the suction pipe 11 itself.

Preferably, a retaining valve 20 and an excess pressure valve 21 are mounted upon the compressed air pipe 16 (Fig. 2). When the pipe 17 is mounted on the suction pipe 11, there is an advantage in balancing the valve 18 so that it will not be drawn off of its seat by the suction in the pipe 17 produced on the suction strokes of the pump. For this purpose, as shown in Fig. 2, the valve 18 is arranged in a chamber formed on the one hand by the valve 18 and its seating and on the other hand by an elastic diaphragm 22 (or the like) the valve stem being made rigid with the diaphragm, and this chamber is placed in communication with the suction pipe 11 through the pipe 17 so that the partial vacuum produced in the suction pipe 11 by the pump 12 acts upon the face of the valve 18, the other face of the diaphragm being acted upon at the same time by an equal and compensating atmospheric pressure tending to push the valve against its seat. A spring 19 suitably chosen once and for all tends normally to press the valve 18 upon its seating and consequently, to close the communication between the pipes 13 and 17 the diaphragm merely affording a compensating atmospheric pressure, to offset the effect of the pump section.

The apparatus shown in Fig. 2 operates in the following manner.

The drawing shows the vessel 2 during its discharging stage and the vessel 1 during its filling stage. As soon as the liquid in the vessel 1 reaches the float 3, the latter is raised. The valve 4 closes the orifice with which it co-operates and prevents the passage of the liquid into the atmospheric exchange pipe 5. If the vessel 2 at this moment is not yet completely empty and the supply pump 12 and the air pump 15 continue to be operated, the first continues to deliver liquid and the second delivers compressed air into the upper part of the vessel.

This compressed air exerts a pressure upon the level of the liquid in the discharging vessel 2 and accelerates the discharge. In addition, it creates upon the corresponding face of the piston 8 a counter pressure which opposes that exerted upon the other face of the piston 8. It will be understood that as long as these two pressures balance each other, the piston 8 will not be able to move and actuate the distributing valve 10.

The excess of liquid delivered by the pump 12, therefore, acts with an increase in pressure upon the valve 18, separates it from its seating and returns into the suction pipe 11, while short circuiting the supply pump 12. The vessel 2 must therefore, be completely emptied and its interior placed at atmospheric pressure by the pipe 14 for the pressure of the liquid, exerted upon the left hand side of the piston 8, to become greater and be able to push this piston towards the right through the medium of the mechanism 9. The distributing valve 10 will be moved to the left and will reverse the communications of the quantity measuring and delivering vessels. These operations will be repeated during the filling of the vessel 2 and the emptying of the vessel 1.

In order to prevent an increase in the pressure of the air, objectionable with regard to the fluid tightness of the apparatus, a safety valve 21 will be mounted upon the pipe 16 this valve opening at a pressure slightly greater than that necessary to lift the valve 18.

The invention may also be applied to a known automatic apparatus in which the distributing member is, for example, a four way cock operated "by hand" as in the example shown in Figs. 3 and 4.

Each of these pieces of apparatus comprises two quantity measuring and delivering vessels 1 and 2, with a float 3 and valve 4, an atmospheric exchange pipe 5, an air admission valve 6, a delivery pipe 13 for the supply pump not shown in Figure 3, a discharge pipe 14 for the liquid delivered and a four way cock 23, serving as distributing members and putting the measuring vessels in communication alternately with the ducts 13 and 14.

It is seen in Fig. 3 that a pipe 17 has been mounted upon the pipe 13 which pipe 17 is adapted to deliver, as in the case of the distributor shown in Fig. 2, into the suction pipe 11 of the supply pump. The pipe 17 is provided with a valve 18 which may be balanced, as shown in Fig. 4 when the pipe 17 is closed upon the suction pipe 11 of the pump. The pipe 16 connecting the air pump 15 (Fig. 4) to the atmospheric exchange duct is provided with a retaining valve 20 and an excess pressure valve 21.

The pieces of apparatus shown in Figs. 3 and 4 are provided with a cock 23 which must remain locked, according to the invention, for as long as one of the measuring vessels is not completely filled and the other completely empty. For this purpose the liberation of the cock is placed under the control of the difference in pressure exerted in the two measuring vessels, in the following manner;

Upon the movable part of the cock is mounted a disc 24 provided with two notches 25 and 26 and, according to the embodiment shown in Fig. 3, an anchor 27 is provided which is adapted to oscillate about a fixed point 28 and is provided with beaks 29 and 30. This anchor is arranged in such a way that for one of the end positions of the cock, for example that shown in the drawings (Fig. 3) the beak 29 engages in the notch 26 while for the other end position the beak 30 enters the notch 25. This anchor is actuated through the medium of a rod 31 pivotally mounted at one end upon the anchor 27 and at the other at 32 upon a reversing device 9 having an abrupt action. This sudden reversal device is actuated by a modified piston 8, the two faces of which receive the pressure of the liquid in the measuring vessels.

For each end position of the piston, for example for the left hand position shown in Fig. 3, corresponding to the filling of the vessel 1, the anchor 27 locks the cock 23. When the pressure acts upon the left hand side of the piston and becomes greater than that exerted upon the other side, that is to say, at the moment when the vessel 2 is completely emptied and the vessel 1 completely full, the piston 8 is displaced as far as its extreme right hand position, operates the sudden reversal device 9 and through the medium of the rod 31 pivots the anchor to the left, so that the beak 30 engages in the notch 25 in order to lock the cock 23 in the other extreme position into which it will have been moved.

In the example shown in Fig. 4, the valve 18 is advantageously balanced as in the example shown in Fig. 2. The locking member is no longer controlled by the driving piston 8 but by a fluid tight elastic diaphragm 33 (or the like: piston, cylinder, etc.) one face of which is acted upon by the pressure of the liquid in the delivery pipe 13 of the pump, while the other face is acted upon by the pressure of the compressed air.

A rod 35 connected to the diaphragm 33 acts at 36 upon a lever 39 pivoted about a fixed shaft 38. This lever carries a pin 40 which engages in one or the other of the notches 25 or 26 according to the position occupied by the cock. The operation of this device is as follows:

The diaphragm 33 is deformed towards the left when the pressure on the liquid delivery side is greater than the pressure on the compressed air delivery side. The deformation of the diaphragm 33 is produced in opposition to the action of the spring 34 which is suitably chosen and acts through the medium of the rod 35 upon the lever 39 oscillating about a fixed point 38, the effect of which is to disengage the pin 40 from one or the other of the notches 25 or 26. The cock 23 can then be turned. When this last operation is completed the excess pressure in the vessel, which was previously being filled due to the continuation of the pumping action, ceases; the diaphragm 33 enters into its normal position, and the pin 40 again engages in one of the notches 25 and 26 in order to lock the cock 23.

From the examples considered, it will be seen that whatever be the type of apparatus, the movement of the reversing member or distributing member only takes place when the pressure in one of the vessels is definitely higher than that in the other. In practice, it will take place when the pressure in the emptying vessel approaches or is equal to the atmospheric pressure, that is to say, when this measuring vessel is completely empty and the other vessel completely full.

It goes without saying, that the invention is not limited in any way to the embodiments described herein before but that it also includes all modifications based upon the same method.

Having now particularly described and ascertained the nature of my said invention, and in what manner the same is to be performed, I desire that what I claim is:

1. A liquid distributor comprising two measuring vessels, a filling pipe common to the two measuring vessels, a discharge pipe common to the two measuring vessels, a reversing member placed between said pipes and said vessels, means to lock the said reversing member controlled by the differences of pressure existing in said vessels, said filling pipe having a discharge passage branching off therefrom, a valve to close off said discharge passage, a supply pipe for admitting gas under pressure, said supply pipe having passages connecting with the two vessels, the pressure of the gases being such that the forces tending to maintain the reversing member in its locking position are greater than the pressure in the vessel on filling, and means to carry the said valve into its closure position.

2. A liquid distributor comprising two measuring vessels, a filling pipe common to the two measuring vessels, a discharge pipe common to the two measuring vessels, a reversing member placed between said pipes and said vessels, a supply pipe for admitting gas under pressure to said measuring vessels, and means for supplying gas under a greater pressure to the measuring vessel being emptied than the pressure in the measuring vessel being filled so as to maintain said reversing member in one of its fixed end positions.

3. A liquid distributor comprising two measuring vessels, a filling pipe common to the two measuring vessels, a discharge pipe common to the two measuring vessels, a reversing member placed between the said pipes and said vessels adapted to be operated by the differences of pressure existing in said vessels, a pump for forcing the liquid through said filling pipe to said vessels, a by-pass in said filling pipe around said pump, a valve in said by-pass, means normally maintaining said valve in closed position weaker than the excess pressure produced by said pump in said liquid upon complete filling of a vessel, and means for supplying gas under a greater pressure to the vessel being emptied than the pressure opening the valve.

4. A liquid distributor comprising two measuring vessels, a liquid filling pipe common to said two measuring vessels, a discharge pipe common to said two measuring vessels, a reversing member placed between said pipes and said vessels adapted to be operated by the differences of pressure existing in said vessels, a gas compressor, and means for supplying gas under pressure from said gas compressor to said measuring vessels to maintain said reversing member in position against the pressure of the liquid in the vessel being filled.

5. A liquid distributor comprising two measuring vessels, a filling pipe common to said two measuring vessels, a discharge pipe common to said two measuring vessels, a reversing member placed between said pipes and said vessels controlled by the differences of pressure existing in said vessels, a supply pipe for admitting gas under pressure, said supply pipe having passages connecting with said two vessels, means for supplying gas under pressure to said supply pipe, a feed pump connected to said filling pipe, a by-pass in said filling pipe encircling said pump, a valve in said by-pass, and means connected to said valve to render said valve independent of the pressure which travels in the suction passage of said pump.

6. A liquid distributor comprising a plurality of measuring vessels, a filling pipe common to said measuring vessels, a discharge pipe common to said measuring vessels, a reversing member placed between said pipes and said vessels operable by the differences of pressure existing in said vessels, a gas compressor, and means for supplying gas under pressure to said measuring vessels from said gas compressor.

7. A liquid distributor comprising two measuring vessels, a filling pipe common to said two measuring vessels, a discharge pipe common to said two measuring vessels, a reversing member placed between said pipes and said vessels controlled by the differences of pressure existing in said vessels, means for introducing gas under pressure to said measuring vessels from an exterior source, and means for regulating the pressure of said gas so as to maintain said reversing member in position against the pressure in the vessel being filled.

8. A liquid distributor comprising two measuring vessels, a filling pipe common to said two measuring vessels, a discharge pipe common to said two measuring vessels, a reversing member placed between said pipes and said vessels controlled by the differences of pressure existing in said vessels, a feed pump connected to said filling pipe, a by-pass in said filling pipe about said pump, a valve in said by-pass to regulate the pressure of the liquid in the vessel being filled, an air-compressor, a conduit leading from said air compressor common to said two measuring vessels, and means for regulating the pressure of said gas under pressure in said conduit.

9. A liquid distributor comprising two measuring vessels, a filling pipe common to said measuring vessels, a discharge pipe common to said measuring vessels, a reversing member placed between said pipes and said vessels, means locking said reversing member controlled by the differences of pressure existing in said vessels, and means for introducing gas under pressure to said measuring vessels from an exterior source.

10. A liquid distributor comprising two measuring vessels, a filling pipe common to said measuring vessels, a discharge pipe common to said measuring vessels, a reversing member placed between said pipes and said vessels, means locking said reversing member controlled by the differences of pressure existing in said vessels, a conduit for gas under pressure common to said two measuring vessels, and a gas compressor for feeding gas under pressure into said conduit.

RENÉ PORTE.